United States Patent
Lee et al.

(10) Patent No.: US 7,697,562 B2
(45) Date of Patent: Apr. 13, 2010

(54) APPARATUS AND METHOD FOR TRANSMITTING DATA IN A WIRELESS LOCAL AREA NETWORK

(75) Inventors: Kyu-Ho Lee, Seoul (KR); Hee-Yong Youn, Seongnam-si (KR)

(73) Assignees: Samsung Electronics Co., Ltd., Suwon-si (KR); Sungkyunkwan University Foundation for Corporate Collaboration, Suwon (KR)

( * ) Notice: Subject to any disclaimer, the term of this patent is extended or adjusted under 35 U.S.C. 154(b) by 755 days.

(21) Appl. No.: 11/446,500

(22) Filed: Jun. 5, 2006

(65) Prior Publication Data

US 2007/0076741 A1 Apr. 5, 2007

(30) Foreign Application Priority Data

Jun. 4, 2005 (KR) ...................... 10-2005-0048128

(51) Int. Cl.
  *H04L 12/413* (2006.01)
  *H04J 3/17* (2006.01)
(52) U.S. Cl. ...................... 370/447; 370/462
(58) Field of Classification Search ................. 370/329, 370/335, 348, 445, 447, 462
See application file for complete search history.

(56) References Cited

U.S. PATENT DOCUMENTS

| | | | |
|---|---|---|---|
| 5,914,950 A * | 6/1999 | Tiedemann et al. | 370/348 |
| 6,381,250 B1 * | 4/2002 | Jacobson et al. | 370/468 |
| 6,928,061 B1 * | 8/2005 | Garcia-Luna-Aceves et al. | 370/329 |
| 7,027,462 B2 * | 4/2006 | Benveniste | 370/447 |
| 7,386,014 B2 * | 6/2008 | Flemming et al. | 370/503 |
| 2005/0122989 A1 * | 6/2005 | Ginzburg et al. | 370/445 |

* cited by examiner

*Primary Examiner*—William Trost, IV
*Assistant Examiner*—Roberta A Shand
(74) *Attorney, Agent, or Firm*—Roylance, Abrams, Berdo and Goodman, LLP (57) ABSTRACT

An apparatus and method are provided for transmitting data in a station of a wireless local area network (LAN) system. In the apparatus, a data queue stores transmission data, and a data processor processes data output from the data queue. A radio frequency (RF) module up-converts a signal output from the data processor to a frequency band of the wireless LAN system, and transmits the up-converted signal as an RF signal. A scheduler performs scheduling such that a specific stepping index decreases each time a backoff time reaches '0' so as to determine whether to transmit the data, and the data is transmitted when both the stepping index and the backoff time reach '0'. A backoff stepping generator determines an initial value of the stepping index within a predetermined range.

14 Claims, 6 Drawing Sheets

FIG.5

APPARATUS AND METHOD FOR TRANSMITTING DATA IN A WIRELESS LOCAL AREA NETWORK

CROSS-REFERENCE TO RELATED APPLICATIONS

This application claims the benefit under 35 U.S.C. §119(a) of Korean Patent Application No. 10-2005-0048128 entitled "Apparatus and Method for Transmitting Data in a Wireless Local Area Network" filed in the Korean Intellectual Property Office on Jun. 4, 2005, the entire disclosure of which is hereby incorporated by reference.

BACKGROUND OF THE INVENTION

1. Field of the Invention

The present invention relates generally to an apparatus and method for transmitting data in a wireless Local Area Network (LAN) system. More particularly, the present invention relates to an apparatus and method for preventing collision occurring during data transmission in a wireless LAN system.

2. Description of the Related Art

In general, wireless communication systems can be classified as a mobile communication system, a wireless LAN system, or a Broadband Wireless Access (BWA) communication system. Of these systems, the wireless LAN system has been developed from the wire LAN system with the rapid progress of technology, thereby meeting increasing user demands. The wireless LAN systems are used not only for constructing home networks, but also for constructing small-scale communication networks in companies.

The latest key issue in the wireless LAN system is related to a scheme for improving Quality of Service (QoS). The improvements in QoS are being made in various fields, and one of the fields provides a scheme for decreasing a delay and increasing throughput of the system. However, the throughput of the system cannot be increased by simply increasing only the data rate because of the increase in the number of users using the wireless LAN system. More specifically, the development of technology makes it possible to construct home networks at lower costs and construct small-scale networks in companies. Therefore, the number of stations (or terminals) constituting the networks has increased. Due to the increase in the number of stations, generation of transmission data frequently occurs for each station, causing an increase in the number of cases where different stations simultaneously transmit data.

If multiple stations simultaneously transmit data as stated above, collision occurs between the data transmitted by the stations, raising the problem that access nodes (ANs) or receiving stations of the wireless LAN system cannot normally receive the data. In this case, therefore, the stations may perform retransmission. However, the retransmission causes a reduction in the throughput and occurrence of transmission delay, leading to a decrease in the QoS.

Figure 1:
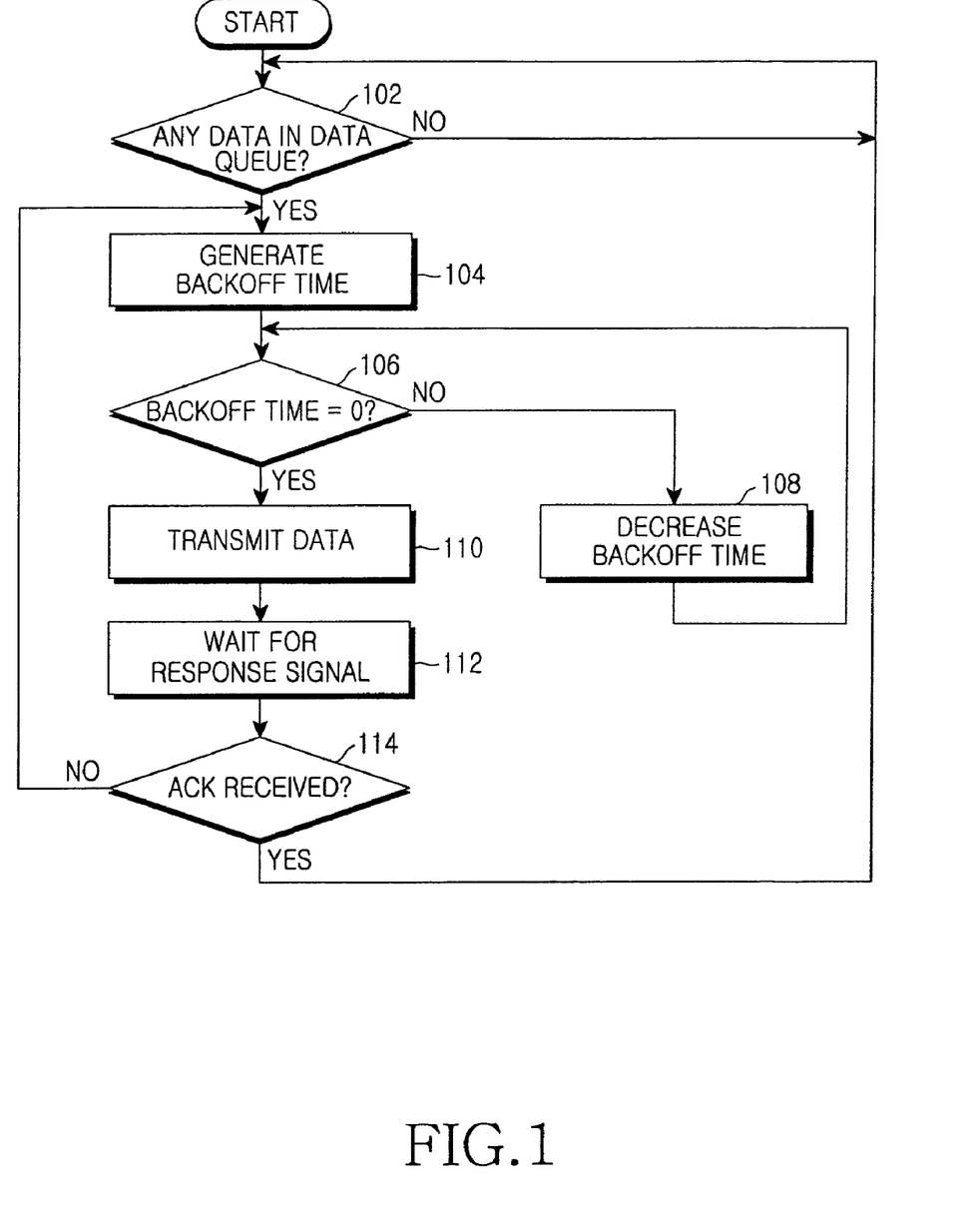
FIG. 1 is a flowchart illustrating a process of transmitting data according to a MAC protocol of the IEEE 802.11 standard.

With reference to FIG. 1, a description will now be made of a process of transmitting data using a Medium Access Control (MAC) protocol for a Distributed Coordination Function (DCF) and an Enhanced Distributed Coordination Function (EDCF) in an IEEE 802.11/802.11e system, which is a standard of the current wireless LAN system.

FIG. 1 is a flowchart illustrating a process of transmitting data according to a MAC protocol of the IEEE 802.11 standard.

A MAC protocol processor of a transmitter determines in step 102 whether there is any transmission data in a transmission queue. If it is determined that there is transmission data, the MAC protocol processor generates a backoff time in step 104. The backoff time is generated in the EDCF by unconditionally generating a specific number as a random number in an initial contention window regardless of a state of the network. After generating the backoff time, the transmitter determines in step 106 whether the generated backoff time has a value of '0'. If it is determined that the backoff time has a value of '0', the transmitter transmits data stored in the queue, in step 110. However, if the backoff time does not have a value of '0', the transmitter decreases the backoff time in step 108, and returns to step 106 to determine whether the decreased backoff time is '0'. That is, the transmitter generates a backoff time using a random number in step 104, sequentially decreases the backoff time generated as a random number through steps 106 and 108, and transmits the data in step 110 if the generated random number is '0'.

Thereafter, the transmitter waits for a predetermined time until a response signal is received in reply to the transmitted data in step 112. The transmitter may either successfully receive or fail to receive the response signal from a receiver within the predetermined time as detected in step 114. This is because if the transmitted data suffers collision, the receiver cannot recognize the collision and thus, cannot transmit the response signal. However, if the transmitted data is normally received at the receiver, the receiver transmits the response signal. The receiver transmits only the acknowledge signal (ACK) as the response signal. That is, the receiver transmits the response signal using a CSMA/CA scheme in which the receiver transmits the response signal only when it successfully receives the transmitted data.

Therefore, the transmitter fails to receive the response signal when the receiver suffers reception failure or fails to normally receive the data due to collision. In this case, the transmitter returns to step 104 where it again generates a backoff time in a doubled contention window and then repeats the remaining steps. However, if the receiver normally receives the transmitted data and thus transmits an ACK, the transmitter returns to step 102 where it again determines whether there is any transmission data in the queue.

In the case of transmitting data using the backoff time, a decrease in the number of stations noticeably decreases the probability that collision will occur between backoff times generated as random numbers. However, an increase in the number of stations increases the probability that random numbers generated as backoff times in the stations will be equal to each other. If generation of the same backoff times increases due to the increase in the number of stations, the data throughput decreases in the system according thereto, and the transmission data suffers a corresponding transmission delay, causing a reduction in the QoS.

Accordingly, a need exists for a system and method for preventing collision occurring during data transmission in a wireless LAN system.

SUMMARY OF THE INVENTION

It is, therefore, an object of exemplary embodiments of the present invention to substantially address the above and other problems, and to provide an apparatus and method for increasing QoS during data transmission in a wireless LAN system.

It is another object of exemplary embodiments of the present invention to provide an apparatus and method for increasing throughput of transmission data in a wireless LAN system.

It is yet another object of exemplary embodiments of the present invention to provide an apparatus and method for decreasing a delay of transmission data in a wireless LAN system.

It is yet another object of exemplary embodiments of the present invention to provide an apparatus and method for preventing collision of transmission data in a wireless LAN system.

According to one aspect of exemplary embodiments of the present invention, an apparatus is provided for transmitting data in a station of a wireless local area network (LAN) system. The apparatus comprises a data queue for storing transmission data, a data processor for processing data output from the data queue, a radio frequency (RF) module for up-converting a signal output from the data processor to a frequency band of the wireless LAN system and transmitting the up-converted signal as an RF signal, a scheduler for performing scheduling such that a specific stepping index decreases each time a backoff time reaches '0' so as to determine whether to transmit the data, and the data is transmitted when both the stepping index and the backoff time reach '0', and a backoff stepping generator for determining an initial value of the stepping index within a predetermined range.

According to another aspect of exemplary embodiments of the present invention, a method is provided for transmitting data in a station of a wireless local area network (LAN) system. The method comprises the steps of determining a stepping index for determining whether to transmit data and determining a backoff time, decreasing the backoff time and if the backoff time reaches '0', determining a transmission time of the data while decreasing the stepping index, and transmitting the data if both the backoff time and the stepping index reach '0'.

BRIEF DESCRIPTION OF THE DRAWINGS

The above and other objects, features and advantages of exemplary embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

Figure 2:
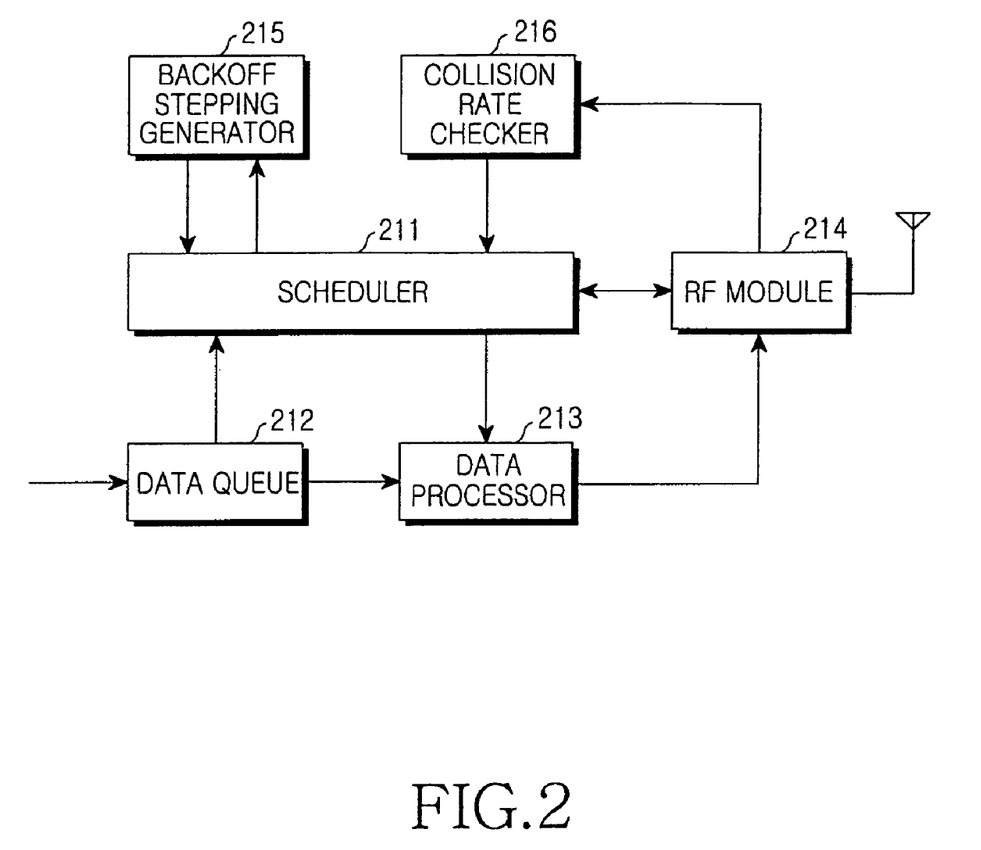
FIG. 2 is a block diagram illustrating an exemplary internal structure of a transmitter for controlling data transmission according to an embodiment of the present invention.

FIG. 2 is a block diagram illustrating an internal structure of an exemplary transmitter for controlling data transmission according to an embodiment of the present invention. With reference to FIG. 2, a detailed description will now be made of an internal structure of a transmitter for controlling data transmission according to an embodiment of the present invention. It should be noted that blocks other than the blocks for data transmission can be included as known to those skilled in the art, but are not shown in FIG. 2 for clarity and conciseness.

An exemplary transmitter comprises a scheduler 211, a data queue 212, a data processor 213, a radio frequency (RF) module 214, a backoff stepping generator 215, and a collision rate checker 216. The data queue 212 is a memory for storing transmission data. If data is stored in the data queue 212, the amount of the stored data and QoS information required in the data are delivered to the scheduler 211.

The data processor 213 segments the data stored in the data queue 212 into a data size according to a transmission standard, and processes the segmented data by, for example, adding a header thereto. In addition, the data processor 213 performs modulation and coding, and receives information on a modulation order and a coding rate from the scheduler 211. The data processed in the data processor 213 is output to the RF module 214 where it is up-converted to a transmission frequency of a wireless LAN system and then transmitted over the air. The RF module 214 provides a signal for detecting a collision rate according to exemplary embodiments of the present invention, to the collision rate checker 216. The collision rate checker 216 checks the current collision rate of the network at predetermined periods, using Equation (1) below.

$$f^j_{current} = \frac{E[\text{collision}^j]}{E[\text{data sent}^j]} \quad (1)$$

In Equation (1), $f^j_{current}$ denotes a current collision rate, collision$^j$ denotes the number of collided data among transmission data, data sent$^j$ denotes the number of the transmission data during the predetermined periods, and the E[ ] denotes an operator for calculating an average value. It can be noted from Equation (1) that a probability for collided data is calculated for the transmission data. The calculated collision rate is delivered to the scheduler 211. Then the scheduler 211 stores the calculated collision rate in its internal memory, and calculates a collision rate trend value $f^j_{avg}$ of the system using the previously calculated collision rate. The collision rate trend value is used for appropriately controlling the collision rate by determining whether the current collision rate is in an increasing trend or a decreasing trend. The collision rate trend value can be accumulated using smoothing factors as shown in Equation (2) below.

$$f^j_{avg} = (1-\alpha) * f^j_{current} + \alpha * f^{j-1}_{avg} \quad (2)$$

In Equation (2), $f^j_{current}$ denotes a currently recalculated collision rate, and $f^{j-1}_{avg}$ denotes a previously calculated collision rate. An α value is determined according to a ratio of the previous value to the current value. In an exemplary implementation, this value is determined by experiment. Although only the previous collision rate is used in Equation (2), it can also be used together with an earlier previous collision rate. That is, the α value can be determined using several previous values, and this corresponds to a simple design modification, so a detailed description thereof will not be given.

The scheduler 211, upon detecting a collision rate from the collision rate checker 216, provides the determined collision rate trend value to the backoff stepping generator 215. The backoff stepping generator 215 then calculates a stepping level according to exemplary embodiments of the present invention, and determines a stepping index using the stepping level value. That is, in exemplary embodiments of the present invention, the stepping index is determined within a range of the stepping level. The backoff stepping generator 215 decreases a stepping level value if the collision rate trend value is less than a minimum threshold (which can be predetermined), and increases the stepping level value if the collision rate trend value is greater than a maximum threshold (which can also be predetermined). The backoff stepping generator 215 provides the determined stepping level value to the scheduler 211. The determination of the stepping level can be performed optionally, so the collision rate checker 216 can be optionally provided. The stepping index is generated as a random number among 0 and the stepping level values, if there is transmission data. Alternatively, the stepping index can also be set to the maximum value of the stepping level value in a congested state of the network. The scheduler 211 can prevent collision of transmission data by performing scheduling using the value received from the backoff stepping generator 215 and the stepping index.

Figure 3:
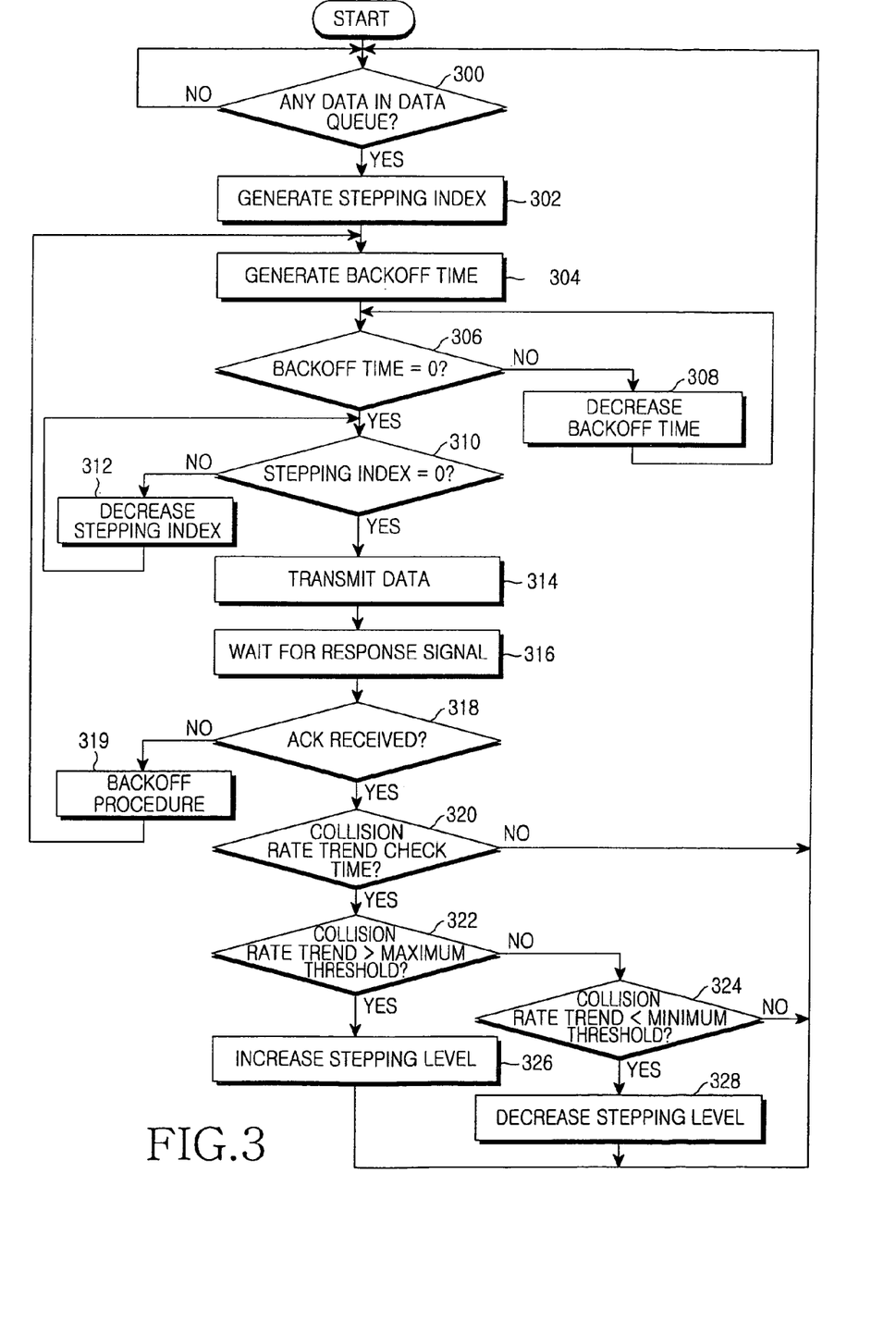
FIG. 3 is a flowchart illustrating an exemplary process of transmitting data in a transmitter according to an embodiment of the present invention.

FIG. 3 is a flowchart illustrating an exemplary process of transmitting data in a transmitter according to an embodiment of the present invention. With reference to FIG. 3, a detailed description will now be made of a process of transmitting data according to an exemplary embodiment of the present invention.

A scheduler 211 of the transmitter determines in step 300 whether there is any transmission data in the data queue 212. If there is any transmission data in the data queue 212, the scheduler 211 proceeds to step 302. Otherwise, the scheduler 211 continues the monitoring of step 300. In step 302, the backoff stepping generator 215 generates a stepping index value in the form of a random number within a certain range of stepping level values (which can be predetermined). For example, if the range of the stepping level values is defined as [0, L], the stepping index value is generated as one of the values of 0 to L. An exemplary embodiment of the present invention is described on the assumption, for example, that the stepping level value is set from [0, 1]. If the stepping index value is not 0, the transmitter according to the exemplary embodiment of the present invention does not transmit the data even though the backoff time is '0'. That is, the transmitter performs data transmission only when the backoff time is set to '0' on condition that the stepping index value is '0'.

After the stepping index value is generated in step 302, the scheduler 211 generates a backoff time in step 304. The backoff time is set using a conventional technique, so a detailed description of a method for setting the backoff time will be omitted. The scheduler 211 determines in step 306 whether the backoff time has reached a value of '0'. If the backoff time has not reached a value of '0', the scheduler 211 decreases the backoff time in step 308. After repeating steps 306 and 308, if the backoff time has reached '0', the scheduler 211 determines in step 310 whether the stepping index generated in step 302 has a value of '0' and if not, decreases the stepping index in step 312.

If it is determined in step 310 that the stepping index value is '1', the corresponding station (or terminal) stops transmitting data. In this case, the station does not start the transmission even though its backoff time is '0'. If one idle state passes by in the state where the backoff time is '0', the stepping index value changes from '1' to '0'. At this time, the station can transmit the data. In this way, exemplary embodiments of the present invention add a stepping index comparison method for avoiding collision to a conventional DCF method. However, if the stepping index value generated in step 302 is '0', the station starts the transmission or decreases the backoff time according to the channel state, like a conventional DCF method.

However, if it is determined in step 310 that the stepping index value is '0', the station transmits the data in step 314, and waits for a response signal transmitted from an access node (AN) that received the data, in step 316. In the process of waiting for a response signal, the station determines in step 318 whether it has received an acknowledge signal (ACK) within a certain time period (which can be predetermined). That is, because the wireless LAN system uses a CSMA/CA scheme in which the station transits the response signal only when it succeeds in transmission as described above, the station proceeds to step 320 if it receives an ACK within the certain time period. However, if the station fails to receive any signal within the certain time period or receives a negative acknowledge signal (NACK), the station performs a backoff procedure in step 319 and then repeats step 304 and the remaining steps, for retransmission.

In steps 320 to 328, the station determines whether to increase/decrease the stepping level based on a collision rate trend value. A detailed description will now be made of the stepping level. In exemplary embodiments of the present invention, a stepping level value initially set in the transmitter is set to '0'. In this state, the station performs collision rate collection for the data exchange with other stations located in the same wireless LAN system. If a collision rate trend is greater than the maximum threshold based on the collision rate, the stepping level value increases by 1. In the exemplary embodiment of the present invention, it is assumed for example, that only [0, 1] is provided for the stepping level value. However, when necessary, [0, 1, 2] can also be provided from the stepping level value. If the number of the stepping level values increases in this way, there is a low probability that the stepping index values generated in the stations will be equal to each other, contributing to avoidance of collision. However, an additional delay caused because the increased stepping index value cycles to '0' may cause slight degradation of the system performance.

Returning to FIG. 3, the station determines in step 320 whether a collision rate trend value check time has been reached. If the time has not been reached, the station returns to step 300 and repeats the remaining steps. However, if the time has been reached, the backoff stepping generator 215 of the station determines in step 322 whether a collision rate trend value is greater than a maximum threshold (which can be predetermined). If the collision rate trend value is greater than the maximum threshold, the backoff stepping generator 215 increases the stepping level value in step 326. However, if the collision rate trend value is less than or equal to the maximum threshold, the backoff stepping generator 215 determines in step 324 whether the collision rate trend value is less than a minimum threshold (which can also be predetermined). If the collision rate trend value is less than the minimum threshold, the backoff stepping generator 215 decreases the stepping level in step 328. In this case, even though the collision rate trend value is greater than the maximum threshold, if a stepping level value (which can be predetermined) is the maximum value, it cannot increase any further. Similarly, even though the collision rate trend value is less than the minimum threshold, if the stepping level value is '0', it cannot decrease any further.

Although certain exemplary embodiments of the present invention adaptively increase/decrease the stepping level value depending on the collision rate trend value, it is also possible to use a default value as the stepping level value or omit the process of setting the stepping level value.

In the operation of FIG. 3, because the transmission frequency and quantity of the data transmitted by each station is different, the stepping index also has a different value. Therefore, even though different stations set the same random number, the stepping index values may differ from each other. This decreases the data collision, increasing throughput of the system and contributing to a reduction in the delay due to collision.

Figure 4A:
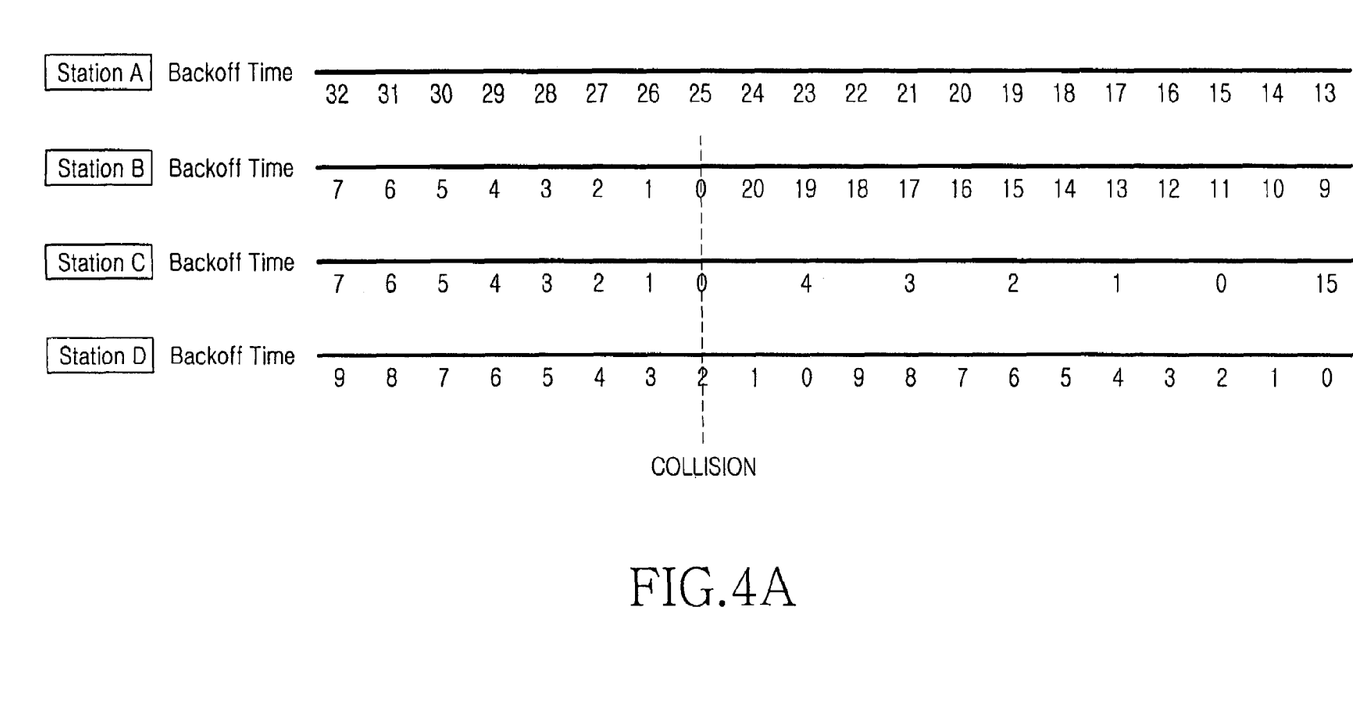
FIGS. 4A and 4B are timing diagrams for illustrating conventional collision phenomena and collision phenomena obtained according to an exemplary embodiment of the present invention, respectively.
Figure 4B:
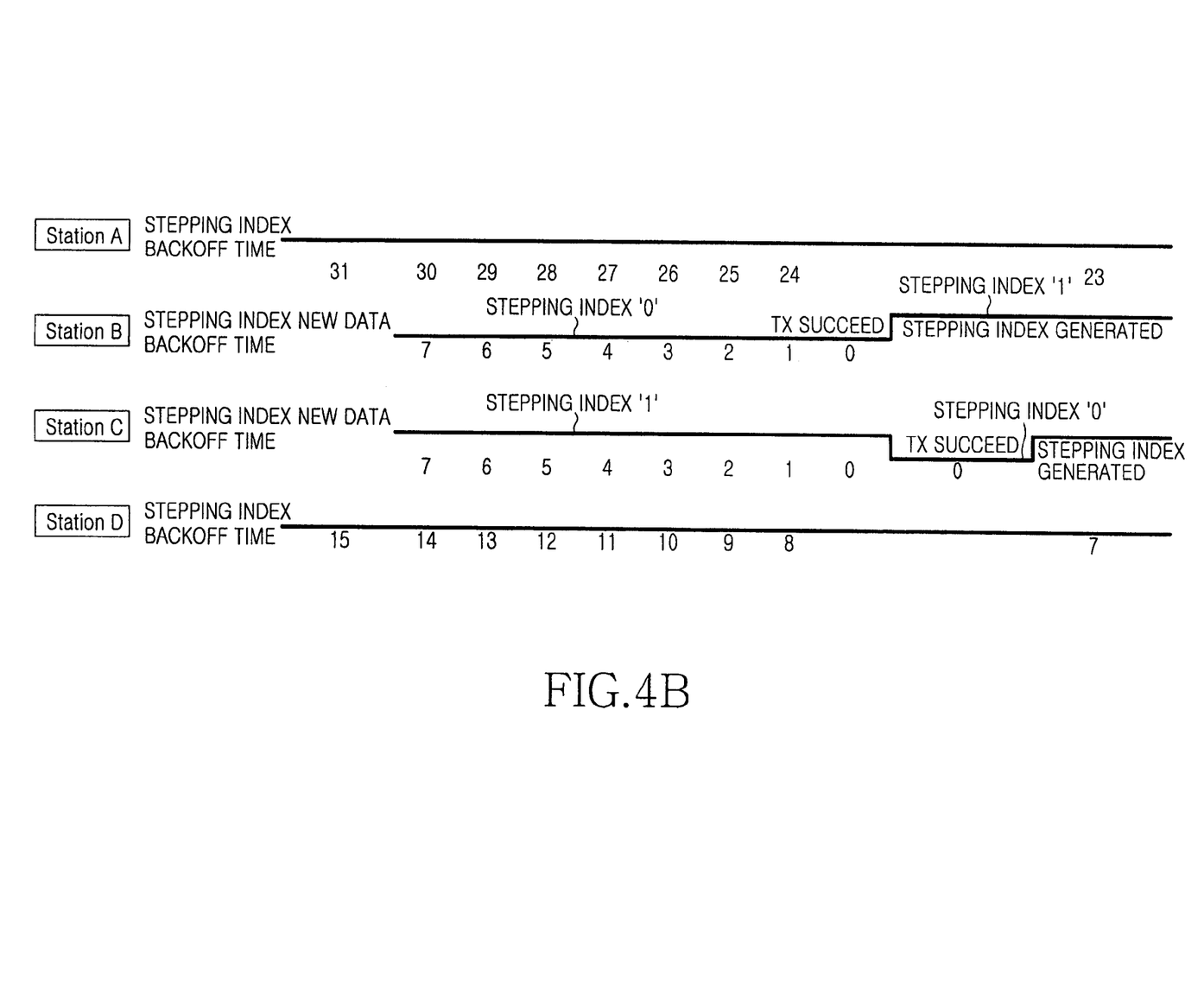

FIGS. 4A and 4B are timing diagrams for illustrating exemplary collision phenomena according to prior art and exemplary embodiments of the present invention, respectively. With reference to FIGS. 4A and 4B, a description will now be made of the collision phenomena according to prior art and exemplary embodiments of the present invention.

FIG. 4A is a timing diagram for illustrating a phenomenon in which collision occurs according to prior art. In this phenomenon, a station B and a station C equally generate a random number 7 as a backoff time. In this case, the station B and the station C have the same data transmission time, and because their backoff times become '0' at the same time in an interval denoted by a dotted line, collision occurs during backoff transmission.

FIG. 4B is a timing diagram for illustrating a phenomenon in which collision is avoided according to exemplary embodiments of the present invention. Even though a station B and a station C generate the same random number 7 as a backoff time as shown in FIG. 4B, the station B with a stepping index value='0' and the station C with a stepping index value='1', even if their backoff times are 0 at the same time, transmit the data at different times due to the different stepping index values, thereby avoiding collision. Therefore, it is possible to avoid the time at which collision actually occurs in the data transmission interval. As a result, the use of the transmission methods according to embodiments of the present invention can increase throughput of the system and prevent the delay due to collision.

Figure 5:
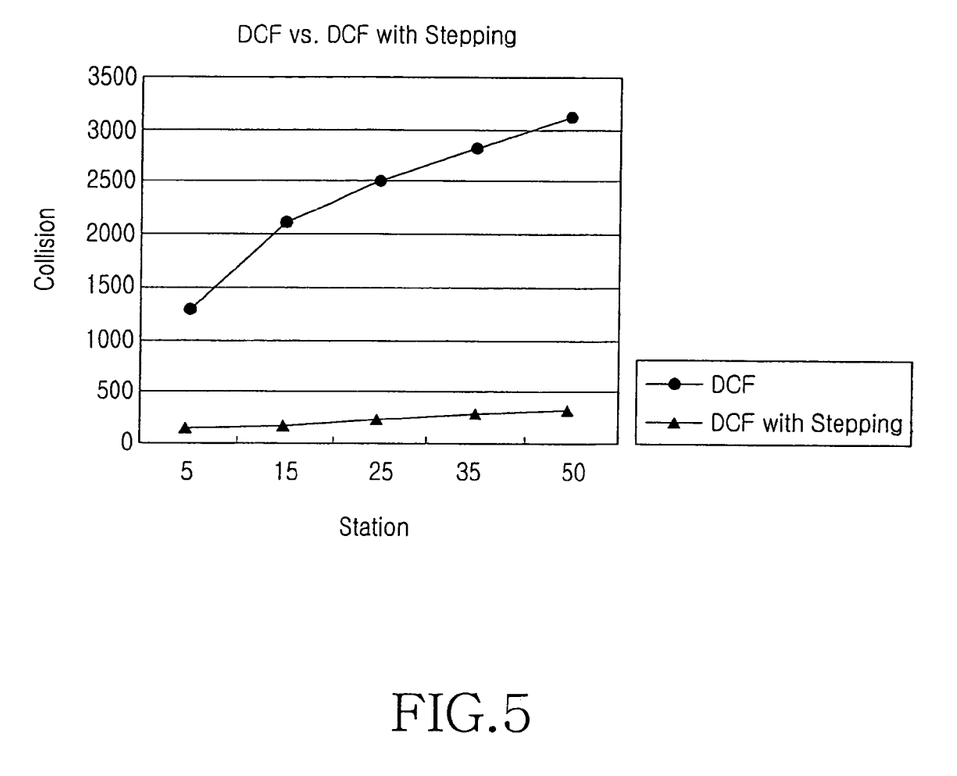
FIG. 5 is a simulation graph obtained through comparison between a conventional collision rate and a collision rate obtained according to an exemplary embodiment of the present invention.

FIG. 5 is a simulation graph obtained through comparison between a conventional collision rate and a collision rate obtained according to an exemplary embodiment of the present invention. The graph of FIG. 5 shows the number of collisions per second. In FIG. 5, a curve with solid circles shows the performance of the DCF defined in IEEE 802.11, and an increase in the number of stations reduces the DCF performance. A curve with solid triangles shows the performance of the DCF according to exemplary embodiments of the present invention. If the methods proposed in the exemplary embodiments of the present invention are used, the increase in the number of stations does not affect the performance.

As can be understood from the foregoing description, the use of the stepping index value according to the exemplary embodiments of the present invention during data transmission in a wireless LAN system can reduce the data collision rate without modification of the system, thereby preventing a delay of data transmission due to the increase in the number of stations and also preventing a reduction in the throughput.

While the present invention has been shown and described with reference to certain exemplary embodiments thereof, it will be understood by those skilled in the art that various changes in form and details may be made therein without departing from the spirit and scope of the invention as defined by the appended claims and their equivalents

What is claimed is:

1. An apparatus for transmitting data in a station of a wireless communication system, the apparatus comprising:
   a data queue for storing transmission data;
   a data processor for processing data output from the data queue;
   a radio frequency (RF) module for up-converting a signal output from the data processor to a frequency band of the wireless communication system and transmitting the up-converted signal as an RF signal;
   a scheduler for performing scheduling, wherein a stepping index decreases when a backoff time reaches '0', and the data is transmitted when both the stepping index and the backoff time reach '0'; and
   a backoff stepping generator for determining an initial value of the stepping index within a range of numbers.

2. The apparatus of claim 1, wherein the backoff stepping generator is configured to generate a random number to determine the initial value of the stepping index.

3. The apparatus of claim 1, further comprising:
   a collision rate checker for checking a collision rate of an RF signal from the RF module for a time period and providing the collision rate,
   wherein the scheduler is configured to calculate a collision rate trend value based on at least one value of the collision rate received from the collision rate checker, and
   wherein the backoff stepping generator is configured to compare the collision rate trend value with a threshold value, and increase or decrease a stepping level for determining a range of the stepping index according to the comparison result.

4. The apparatus of claim 3, wherein the collision rate trend value is calculated using equation, $$f_{avg}^{j} = (1-\alpha) * f_{current}^{j} + \alpha * f_{avg}^{j-1}$$

wherein $f^{j}_{current}$ denotes a currently recalculated collision rate, $f^{j-1}_{avg}$ denotes a previously calculated collision rate, and $\alpha$ denotes a value determined according to a ratio of a previous value to a current value.

5. The apparatus of claim 3, wherein the backoff stepping generator is configured to increase a stepping level if the collision rate trend value is greater than a maximum threshold value, and decrease the stepping level if the collision rate trend value is less than a minimum threshold value.

6. The apparatus of claim 1, wherein the scheduler is configured to decrease a value of the stepping index from the initial value by a unit value if one idle state passes by in a state where the backoff time is '0'.

7. A method for transmitting data in a station of a wireless communication system, the method comprising the steps of:
   determining a stepping index for determining whether to transmit data, and a backoff time;
   decreasing the backoff time;
   if the backoff time reaches '0', determining a transmission time of the data while decreasing the stepping index; and
   transmitting the data if both the backoff time and the stepping index reach '0'.

8. The method of claim 7, wherein an initial value of the stepping index is determined by generating a random number within a range of numbers.

9. The method of claim 7, wherein the stepping index is determined again upon receipt of an acknowledge signal (ACK) in response to the transmitted data.

10. The method of claim 7, further comprising the steps of:
    checking a collision rate of a radio frequency (RF) signal for a period of time;

calculating a collision rate trend value based on a current collision rate and a previous collision rate; and comparing the collision rate trend value with a threshold value, and determining a stepping level for determining a range of the stepping index according to the comparison result.

11. The method of claim 10, wherein a value of the stepping level is periodically updated using the checked collision rate.

12. The method of claim 10, wherein a value of the stepping level is updated using the collision rate trend value calculated based on the checked collision rate in accordance with the following equation for a period of time, $$f_{avg}^{j} = (1-\alpha) * f_{current}^{j} + \alpha * f_{avg}^{j-1}$$

wherein $f^{j}_{current}$ denotes a currently recalculated collision rate, $f^{j-1}_{avg}$ denotes a previously calculated collision rate, and α denotes a value determined according to a ratio of a previous value to a current value.

13. The method of claim 10, wherein the stepping level is increased if the collision ratio trend value is greater than a maximum threshold value, and the stepping level is decreased if the collision ratio trend value is less than a minimum threshold value.

14. The method of claim 10, further comprising the step of:

performing retransmission using the stepping level value and a newly generated backoff time upon failure to receive a response signal in response to the transmitted data within a time period.

* * * * *